(12) United States Patent
Queen et al.

(10) Patent No.: US 11,913,728 B1
(45) Date of Patent: Feb. 27, 2024

(54) THERMAL RETENTION APPARATUS FOR HEATING A LIQUID ON DEMAND

(71) Applicant: PHASESTOR LLC, Asheboro, NC (US)

(72) Inventors: Alfred Scott Queen, Asheboro, NC (US); Byron C. Owens, Asheboro, NC (US)

(73) Assignee: PHASESTOR LLC, Asheboro, NC (US)

( * ) Notice: Subject to any disclaimer, the term of this patent is extended or adjusted under 35 U.S.C. 154(b) by 0 days.

(21) Appl. No.: 18/271,626

(22) PCT Filed: Feb. 14, 2023

(86) PCT No.: PCT/US2023/013069
§ 371 (c)(1),
(2) Date: Jul. 10, 2023

(51) Int. Cl.
*F28D 20/02* (2006.01)
*F24H 7/04* (2006.01)
*F24H 4/04* (2006.01)

(52) U.S. Cl.
CPC ............. *F28D 20/021* (2013.01); *F24H 4/04* (2013.01); *F24H 7/0433* (2013.01)

(58) Field of Classification Search
CPC ......... F28D 20/021; Y02E 60/14; F24H 4/04; F24H 7/0433
See application file for complete search history.

(56) References Cited

U.S. PATENT DOCUMENTS

| 3,062,510 A | 11/1962 | Percival |
| 4,269,263 A * | 5/1981 | Yukimachi ............ F25B 27/007 62/235.1 |
| 5,944,089 A | 8/1999 | Roland |
| 2011/0017196 A1* | 1/2011 | Bell ........................ F24H 1/208 126/400 |
| 2022/0074622 A1* | 3/2022 | Deivasigamani ......... F24D 5/12 |
| 2023/0061277 A1 | 3/2023 | Owens et al. |

FOREIGN PATENT DOCUMENTS

WO 2011/058383 A2 5/2011

* cited by examiner

*Primary Examiner* — Eric S Ruppert
(74) *Attorney, Agent, or Firm* — TILLMAN WRIGHT, PLLC; Chad D. Tillman

(57) ABSTRACT

A thermal retention apparatus includes a tank and a phase change thermal energy storage unit contained within the tank that, in turn, includes a phase change material and a heat exchanger assembly. The heat exchanger assembly includes a phase change material (PCM) charging circuit for charging the phase change material, and a PCM discharging circuit for discharging the phase change material. The heat exchanger assembly includes a plurality of heat exchanger modules immersed within the phase change material, and the PCM charging circuit includes a fluid flow arrangement of the heat exchanger modules that is in parallel. The PCM discharging circuit includes a fluid flow arrangement of the heat exchanger modules that is in series.

1 Claim, 14 Drawing Sheets

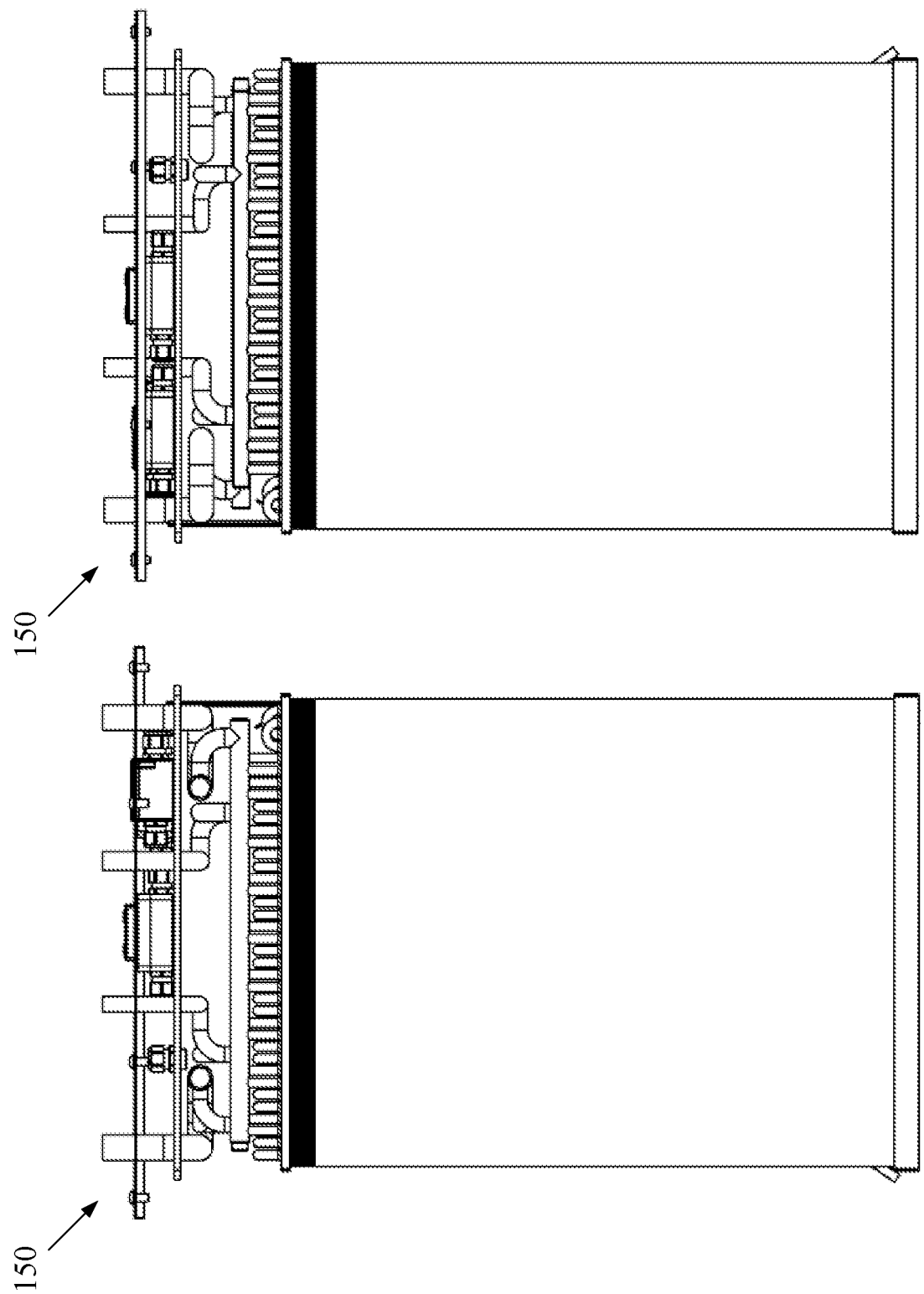

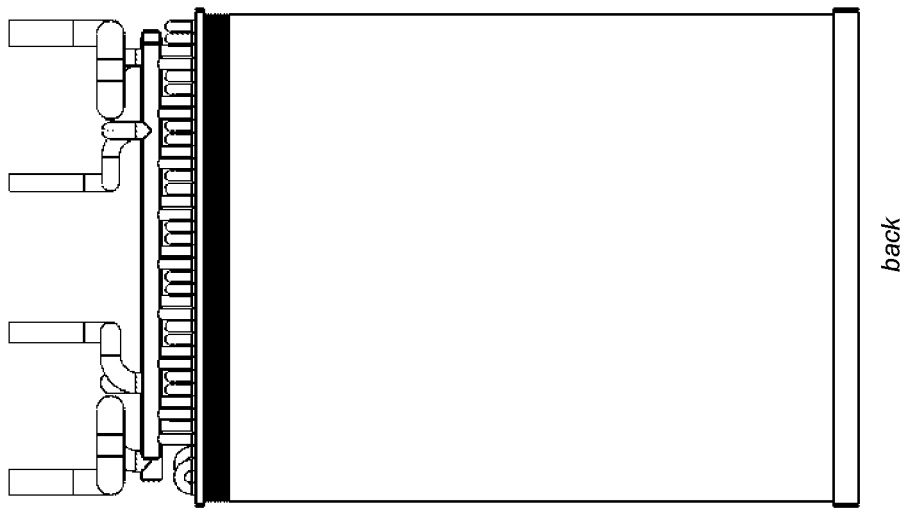
FIG. 17 *back*
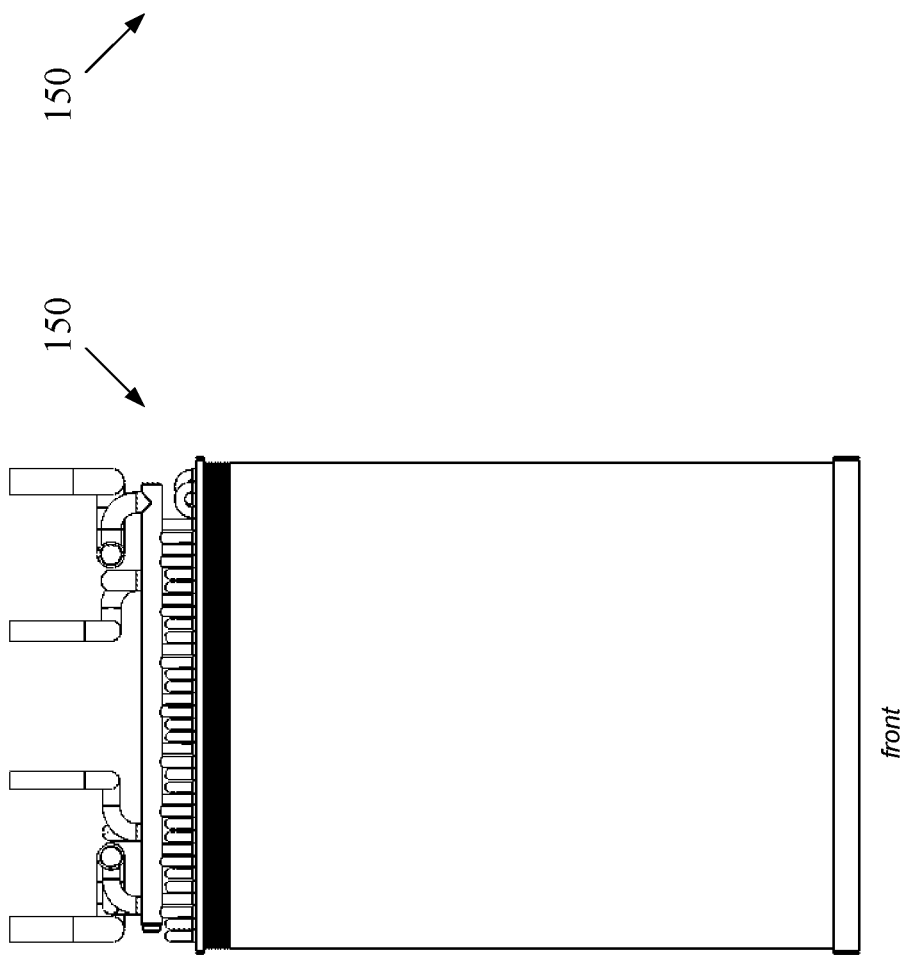
FIG. 16 *front*

THERMAL RETENTION APPARATUS FOR HEATING A LIQUID ON DEMAND

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates thermal retention apparatus that include phase change material, and in preferred embodiments, to such a thermal retention apparatus for use in heating hot water.

In is believed that a need exists for more efficient hot water heaters, especially in areas that experience brown outs due to an overburdened electric utility system. While solar-powered water heaters may be attractive, it is believed such water heaters have failed to match the performance and cost-effectiveness of electric and gas water heaters, and a different solution is therefore needed. Embodiments in accordance with one or more aspects and features of the present invention are believed to provide just such a solution.

SUMMARY OF THE INVENTION

The invention includes many aspects and features. Moreover, while many aspects and features relate to, and are described in, the context of use as a water heater for heating water, the invention is not limited to only such use, as will become apparent from the following summaries and detailed descriptions of aspects, features, and one or more embodiments of the invention.

Accordingly, in an aspect of the invention, a thermal retention apparatus comprises a tank and a phase change thermal energy storage unit. The phase change thermal energy storage unit is contained within the tank and comprises a phase change material and a heat exchanger assembly. The heat exchanger assembly comprises a phase change material (PCM) charging circuit for charging the phase change material, and a PCM discharging circuit for discharging the phase change material. The heat exchanger assembly comprises a plurality of heat exchanger modules immersed within the phase change material. The PCM discharging circuit comprises a fluid flow arrangement of the heat exchanger modules that is in series. In contrast, the PCM charging circuit comprises a fluid flow arrangement of the heat exchanger modules that is in parallel.

In a feature, the apparatus serves as a water heater for heating water.

In a feature, the PCM charging circuit comprises a closed loop.

In a feature, the PCM charging circuit is configured to be switched between a closed loop, in which the fluid that flows through the PCM charging circuit does not flow external to the apparatus, and an open loop, in which the fluid that flows through the PCM charging circuit flows to an external heating source located on an exterior of the apparatus.

Another aspect comprises the aforementioned phase change thermal energy storage unit for use in a thermal retention apparatus.

In another aspect, a method comprises heating water in a residence using an aforementioned thermal retention apparatus.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 8 is a front elevational view of a heat exchanger assembly of the apparatus of FIG. 1.

FIG. 9 is a back or rear elevational view of the heat exchanger assembly of the apparatus of FIG. 1.

FIG. 16 is a front elevational view of the heat exchanger assembly of the apparatus of FIG. 1.

FIG. 17 is a rear or back elevational view of the heat exchanger assembly of the apparatus of FIG. 1.

DETAILED DESCRIPTION

Figure 1:
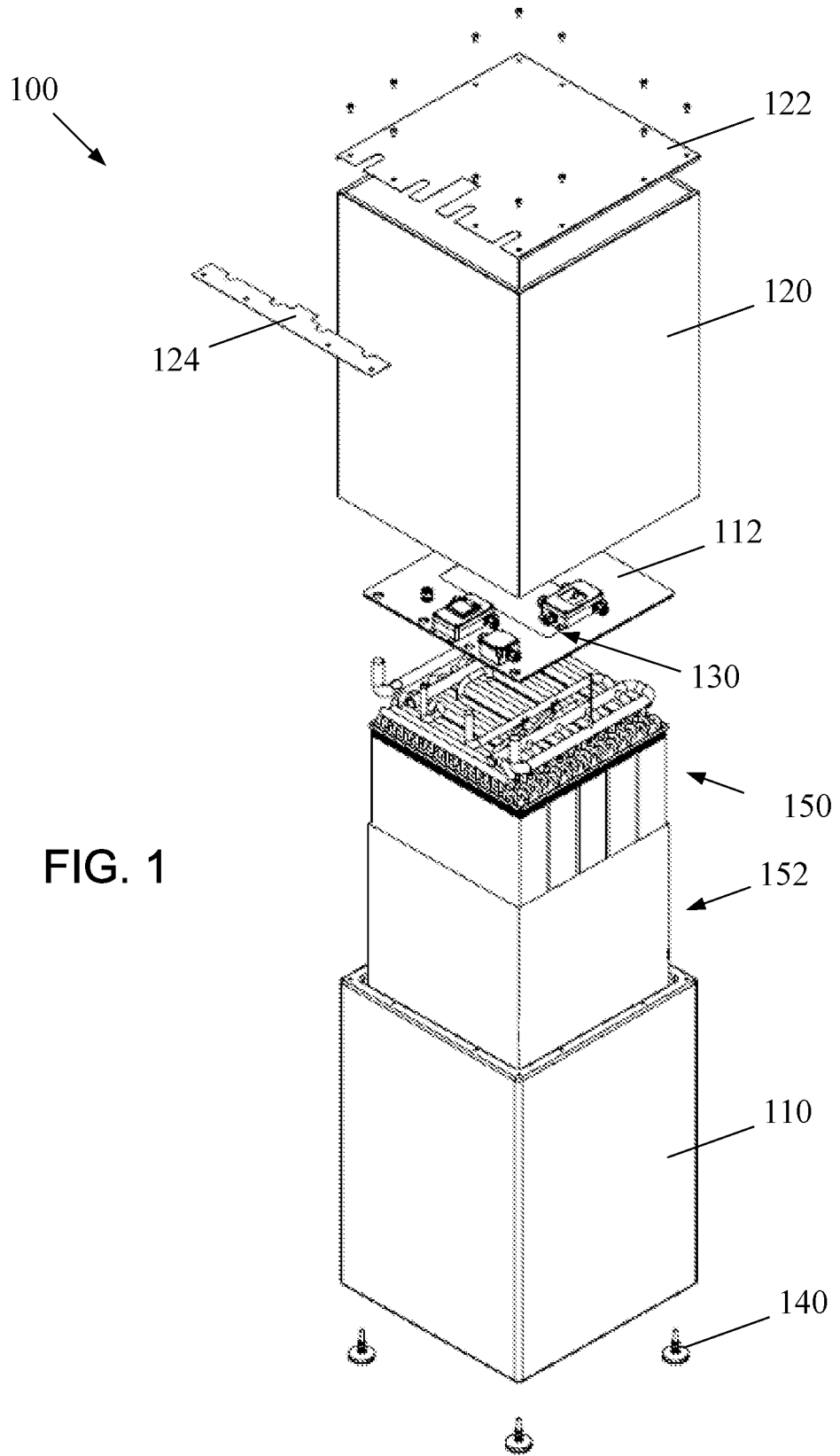
FIG. 1 is an exploded perspective view of a preferred embodiment of a thermal retention apparatus in accordance with one or more aspects and features of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

Figure 2:
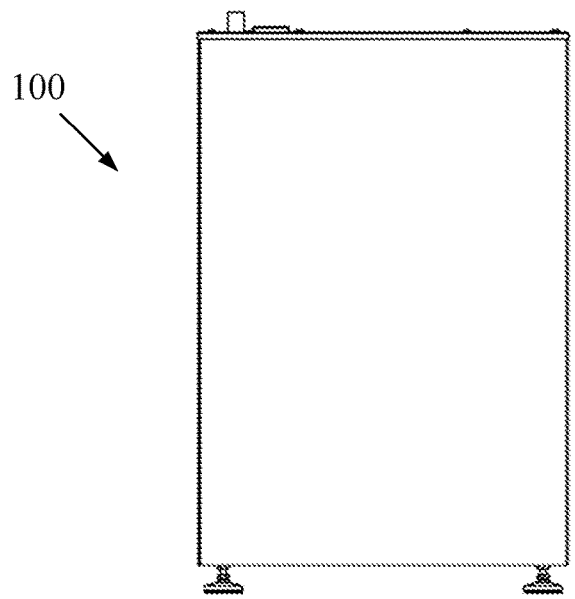
FIG. 2 is an elevational view of a left side of the apparatus of FIG. 1, which also is representative of the mirror image of the elevational view of the right side of the apparatus.
Figure 3:
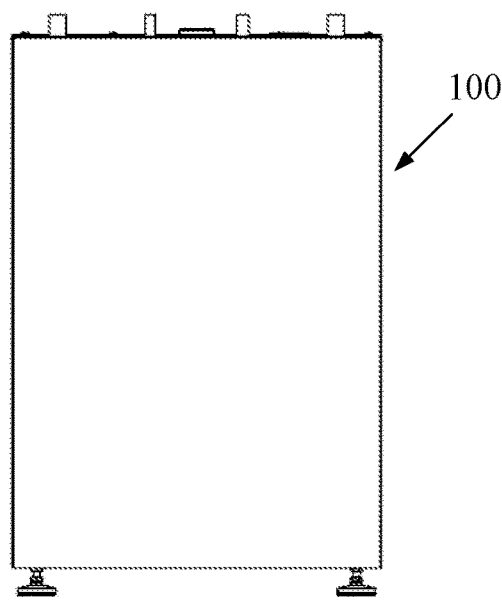
FIG. 3 is an elevational view of a front side of the apparatus of FIG. 1.
Figure 4:
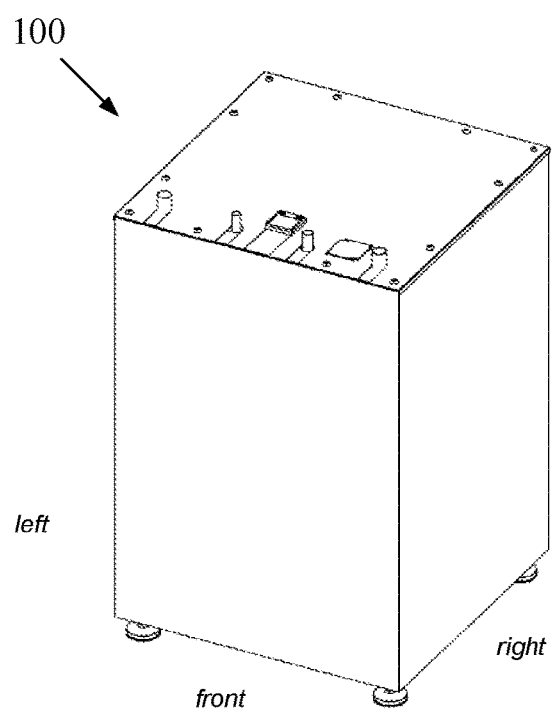
FIG. 4 is a perspective, near isometric view of the apparatus of FIG. 1.
Figure 5:
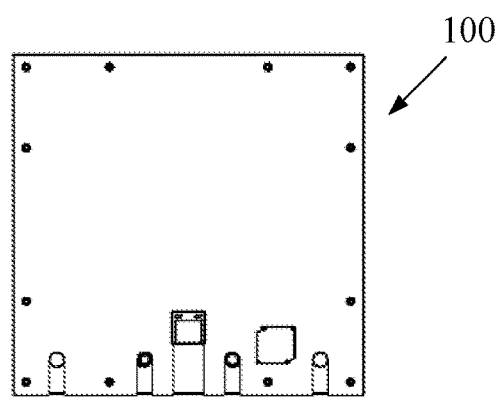
FIG. 5 is a top plan view of the apparatus of FIG. 1.
Figure 6:
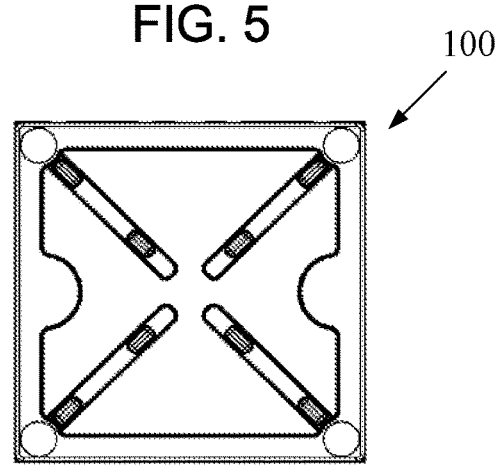
FIG. 6 is a bottom plan view of the apparatus of FIG. 1.

FIGS. 1 through 6 are views of a preferred embodiment of a thermal retention apparatus 100 in accordance with one or more aspects and features of the invention. In this regard, FIG. 1 is an exploded perspective view of the apparatus 100; FIG. 2 is an elevational view of a left side of the apparatus 100, which view also is representative of the mirror image of the elevational view of the right side of the apparatus 100; FIG. 3 is an elevational view of a front side of the apparatus 100; FIG. 4 is a perspective, near isometric view of the apparatus 100; FIG. 5 is a top plan view of the apparatus 100; and FIG. 6 is a bottom plan view of the apparatus 100.

As shown in the figures, the thermal retention apparatus 100 comprises: an interior tank 110 and an interior tank cover 112; an exterior metal container 120 and metal cover comprising overlapping components 122, 124; electronic components 130; four adjustable feet 140; and a phase change thermal energy storage unit comprising a phase change material 152 and two heat exchange circuits 154, 156.

The interior tank 110 preferably comprises insulated walls. The interior tank cover 112 also preferably is insulated. The walls may comprise inner and outer walls defining an interior, insulation space therebetween. The insulating space preferably may be filled with an insulating material, such as foam.

The interior tank 110 has a single opening which the cover 112 seals. The cover 112 further is configured to contain the heat exchanger assembly 150 immersed in the phase change material 152. The phase change material 152 preferably comprises a bio-based, high latent energy phase change material in a state that permits immersion of the heat exchanger assembly 150 when assembled. The phase change material 152 is sealed within the interior tank by the interior tank lid 112. The interior lid 112 includes openings through which extend conduits of the heat exchanger assembly 150. The interior lid 112 also preferably includes one or more openings for thermal wells for measuring temperature of the phase change material 152 within different areas of the interior of the tank 110.

The tank 110 and lid 112 are received through the mouth of the metal container 122 and contained therein. Moreover, an interior space 124 preferably is provided between the lid 112 and the cover 122. The electrical components 130 are mounted to the lid 112 within the interior space. The electrical components preferably include temperature sensors and transceivers for communications using Wi-Fi or Bluetooth, whereby temperature readings within the phase change material 152 may be remotely taken for purposes of determining, for example, whether PCM charging should be performed or continued.

The conduits that extend through the interior tank lid 112 represent inlets and outlets for two heat exchange circuits of the heat exchanger assembly 150: a phase change material (PCM) charging circuit, and a PCM discharging circuit.

The PCM charging circuit represents fluid pathways connected to and extending between an inlet conduit 162 and outlet conduit 164. These fluid pathways extend through the PCM and charge the PCM preferably by heating the PCM. This is accomplished by passing a heated fluid through the pathways of the PCM charging circuit.

The PCM discharging circuit represents fluid pathways connected to and extending between an inlet conduit 166 and outlet conduit 168. These fluid pathways also extend through the PCM and discharge the PCM by removing heat from the PCM. This is accomplished by passing a fluid having a lower temperature than the PCM through the pathways of the PCM discharging circuit.

The pathways of both circuits pass through a plurality of heat exchanger modules. As shown in the drawings, the heat exchanger assembly 150 has five heat exchanger modules 170 (see, e.g., FIG. 13). The pathways through each module for each circuit include passageways that extend vertically from the top to the bottom of the module and then back to the top of the module. The circuit includes manifolds the divide the flow into multiple pathways through the module, each including one or more up and down passageways. The pathways and passageways preferably are defined by copper tubing for efficient heat exchange therethrough. The copper tubing also preferably is surrounded by aluminum fins for further facilitating heat exchange with the phase change material in which the modules are immersed.

It will be appreciated from close examination of the drawings that the PCM charging circuit comprises the heat exchanger modules 170 arranged in parallel, wherein approximately 20% of the fluid flow through the heat exchanger assembly 150 passes through a particular one of the modules 170. The division of the pathways into five separate paths and reconsolidation of the paths is accomplished by manifold conduits 174, 176 perhaps best seen in FIG. 13.

In stark contrast to the PCM charging circuit arrangement, the PCM discharging circuit arrangement comprises the heat exchanger modules 170 all arranged in series, wherein all of the fluid flow through the heat exchanger assembly 150 passes through all of the heat exchanger modules 170. The connecting of the five heat exchanger modules in series is accomplished by four module interconnecting conduits 178.

For charging the phase change material, the inlet and outlet conduits 162 and 164 preferably are connected in fluid communication with an external energy source for heating the fluid that passes through the PCM charging circuit. Such source may comprise, for example, an electrical or solar heat pump or a gas boiler. Optionally, electric heaters also may be immersed within the phase change material for additional heating of the phase change material, which electric heaters may be controlled by the electronic components 130 or may be externally controlled. Exemplary openings 180 (see, e.g., FIG. 13) are provided, for example, in the heat exchanger assembly 150 for receiving therethrough such heaters in the form of elongate rods. In alternative embodiments, discussed below, the interior space also may container one or more pumps and one or more heaters in fluid conduits of the PCM charging circuit, which may be a closed circuit and completely contained within the thermal retention apparatus.

Figure 7:
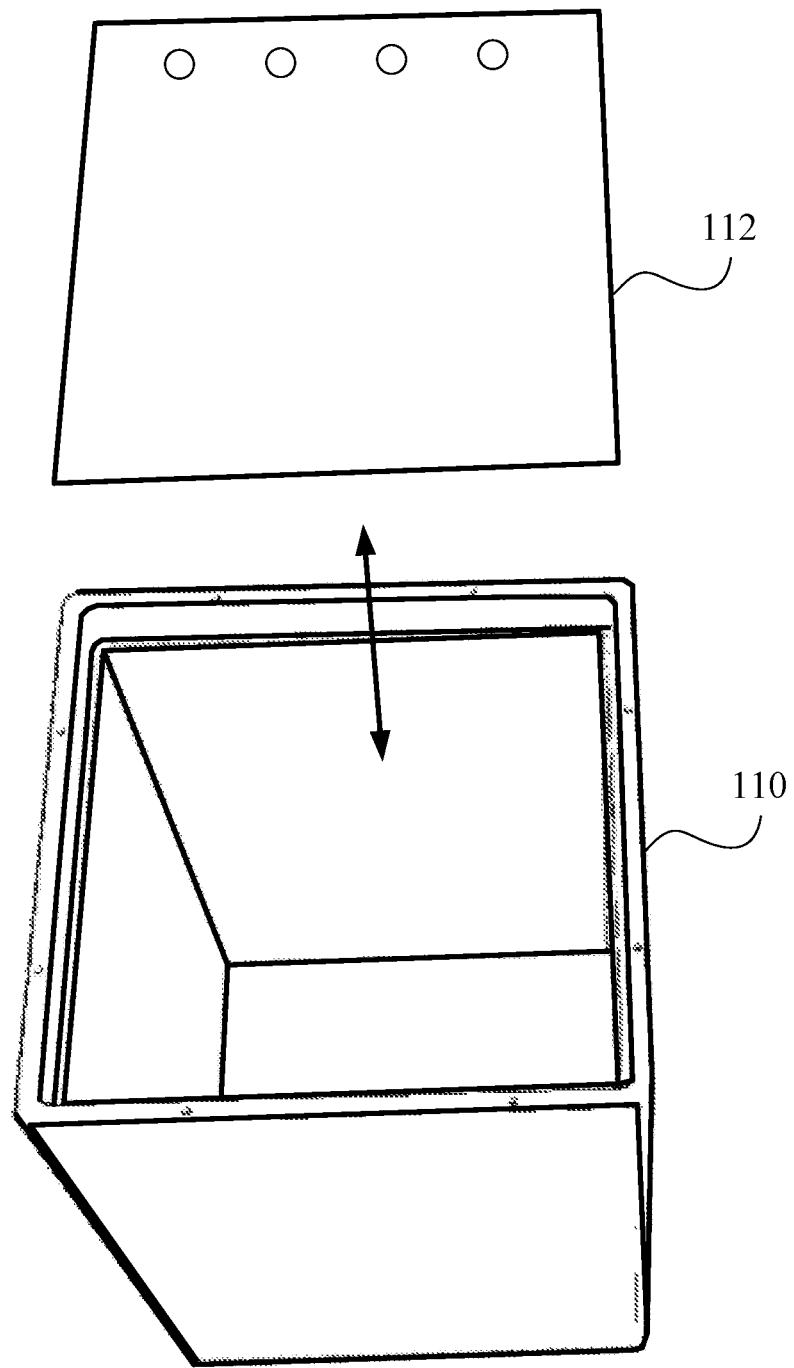
FIG. 7 is an exploded perspective view of an interior tank and an interior tank cover of the apparatus of FIG. 1.
Figure 10:
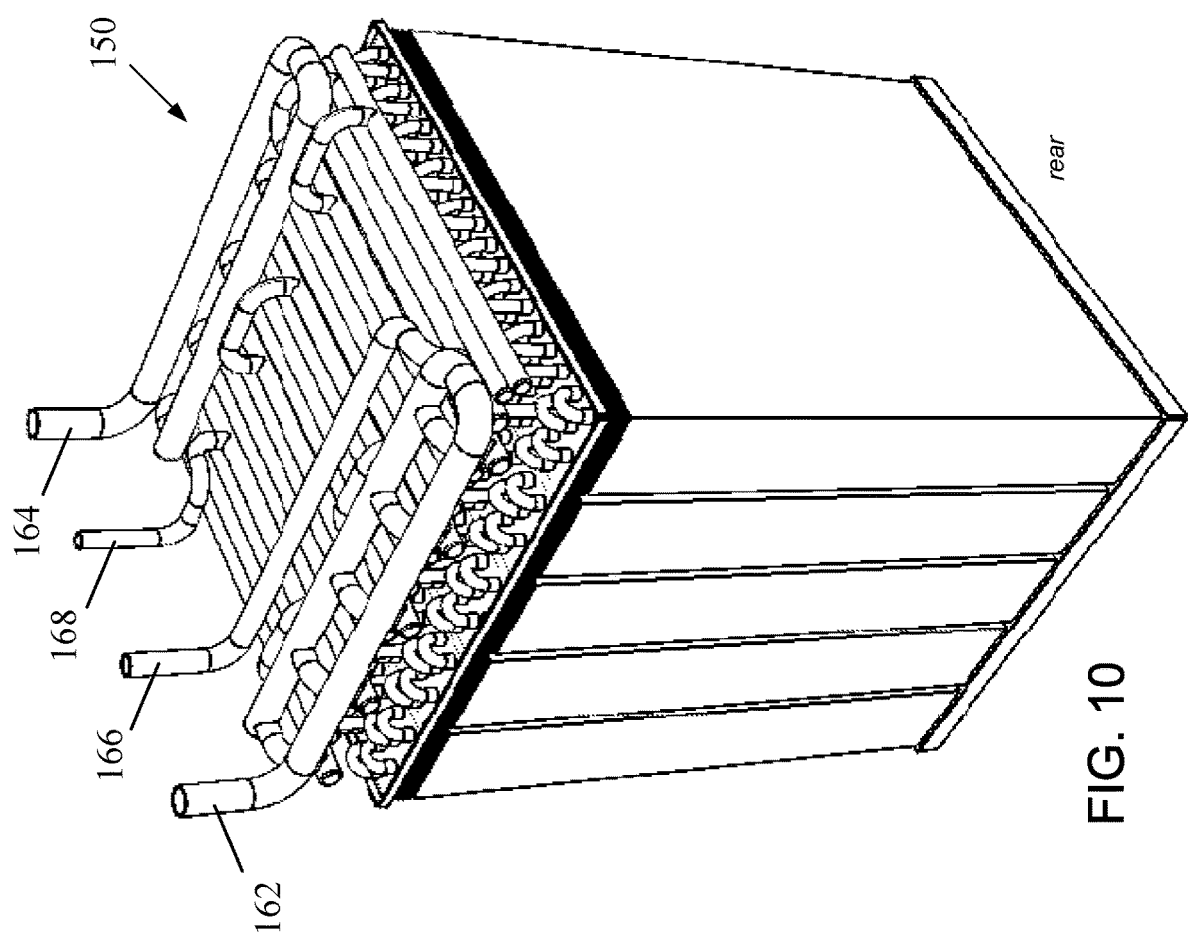
FIG. 10 is an isometric view of the heat exchanger assembly of the apparatus of FIG. 1.
Figure 12:
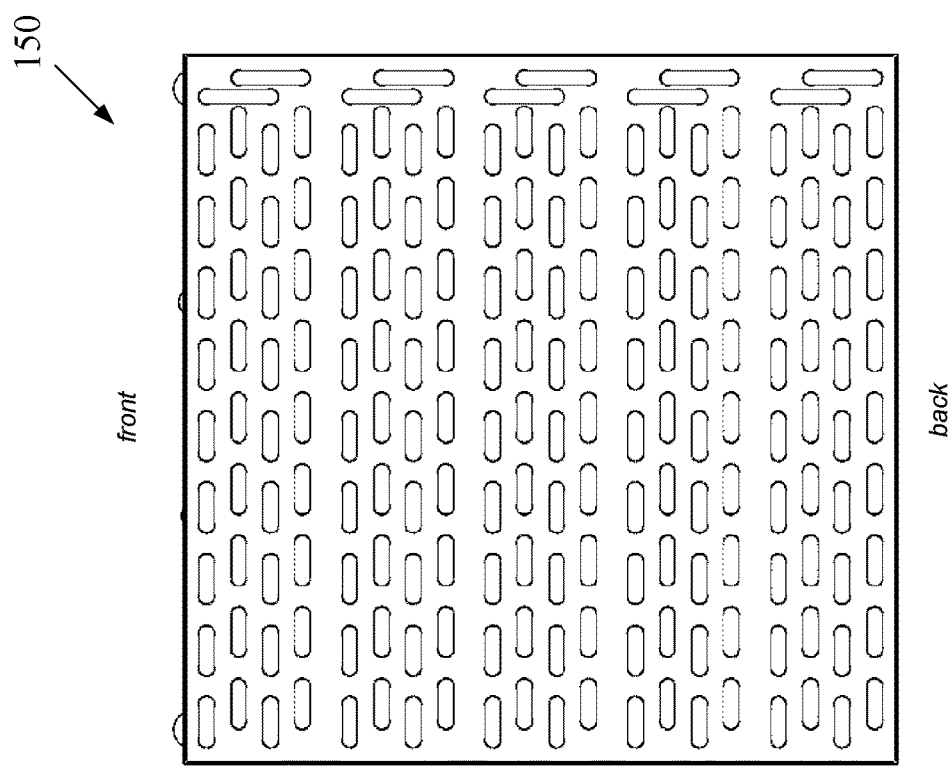
FIG. 12 is a bottom plan view of the heat exchanger assembly of the apparatus of FIG. 1.
Figure 11:
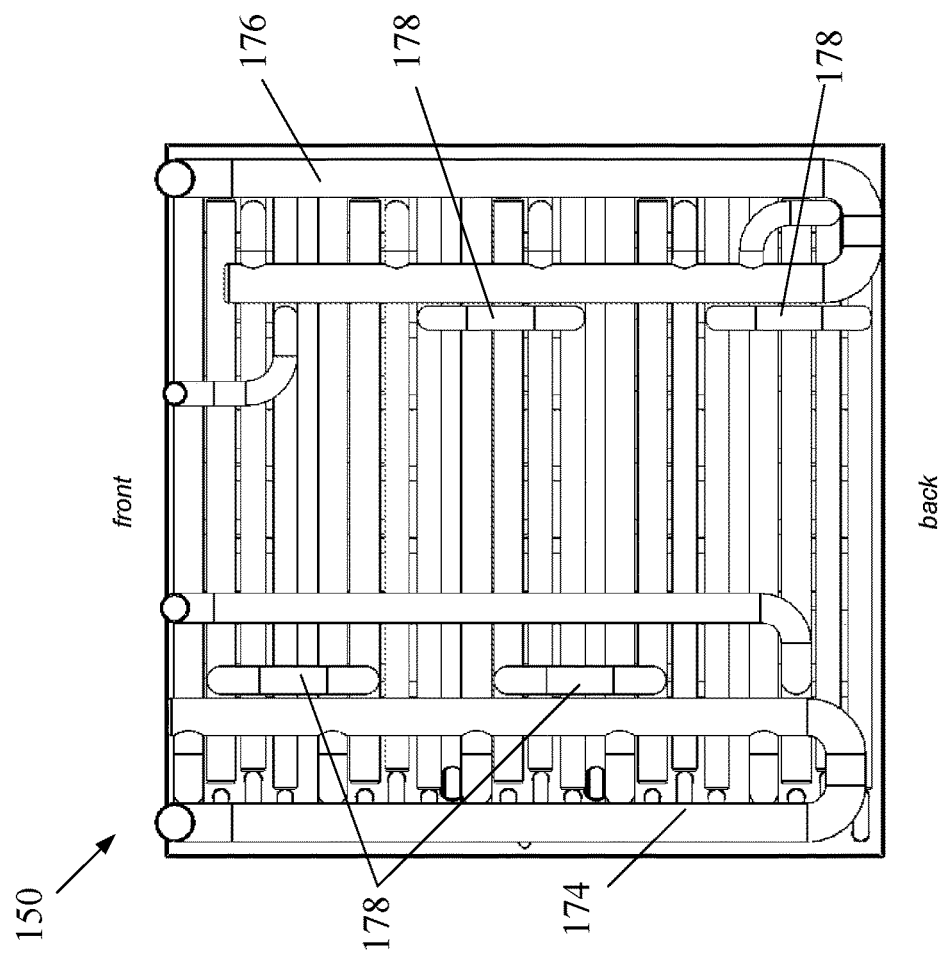
FIG. 11 is a top plan view of the heat exchanger assembly of the apparatus of FIG. 1.
Figure 13:
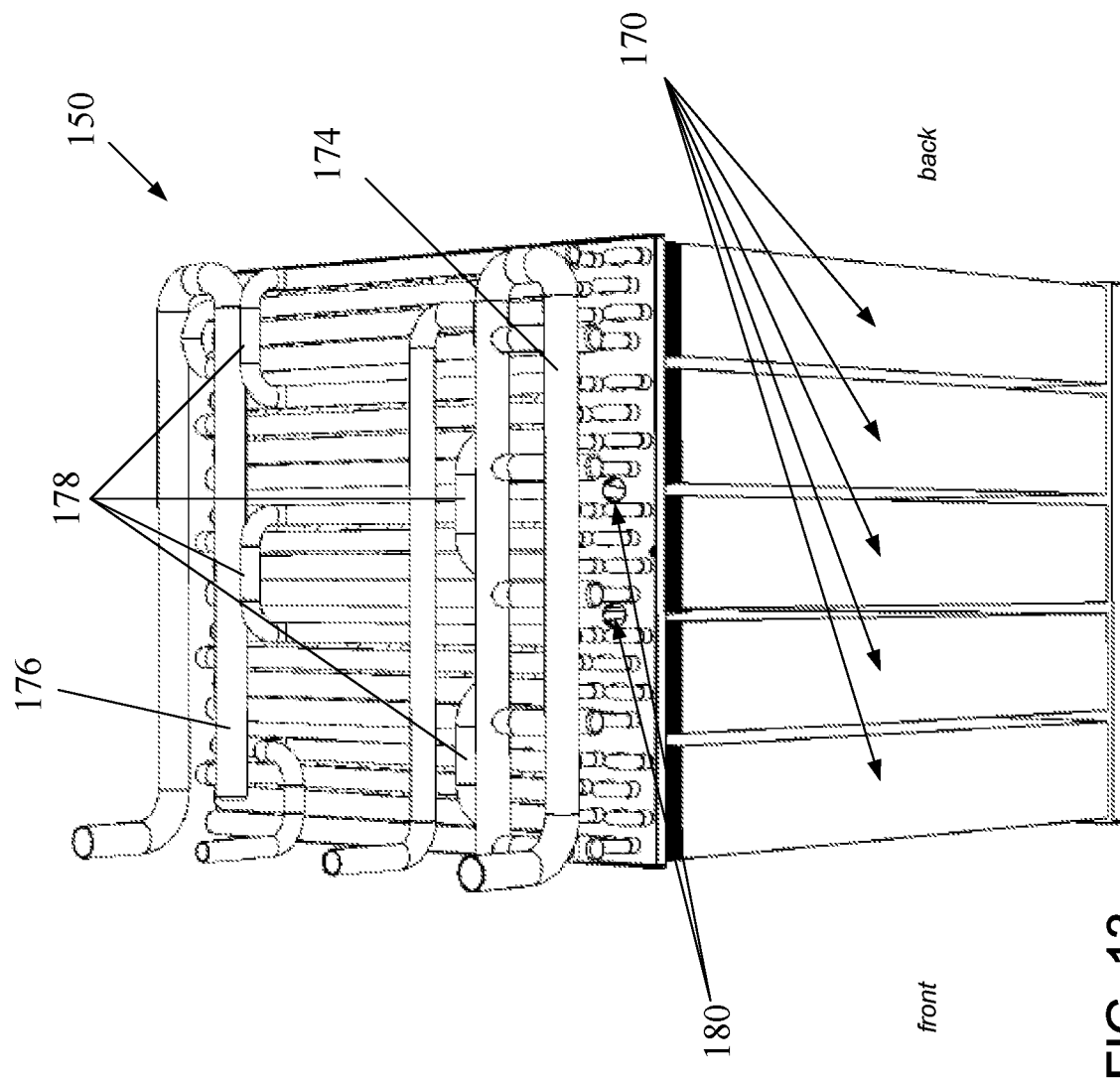
FIG. 13 is a perspective view of the right side of the heat exchanger assembly of the apparatus of FIG. 1.
Figure 15:
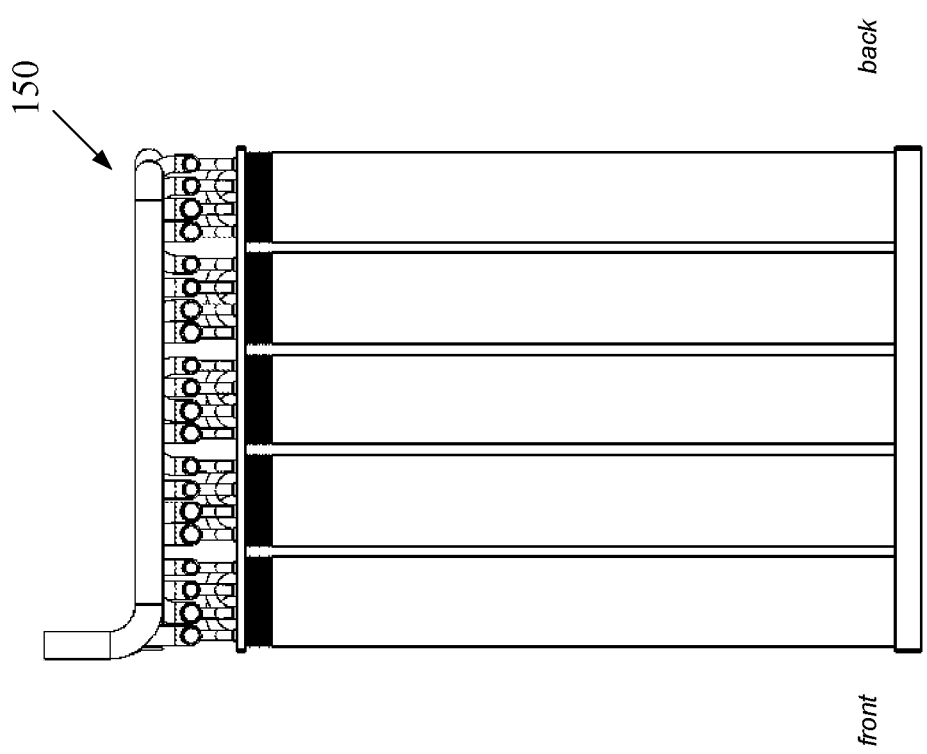
FIG. 15 is a right side elevational view of the heat exchanger assembly of the apparatus of FIG. 1.
Figure 14:
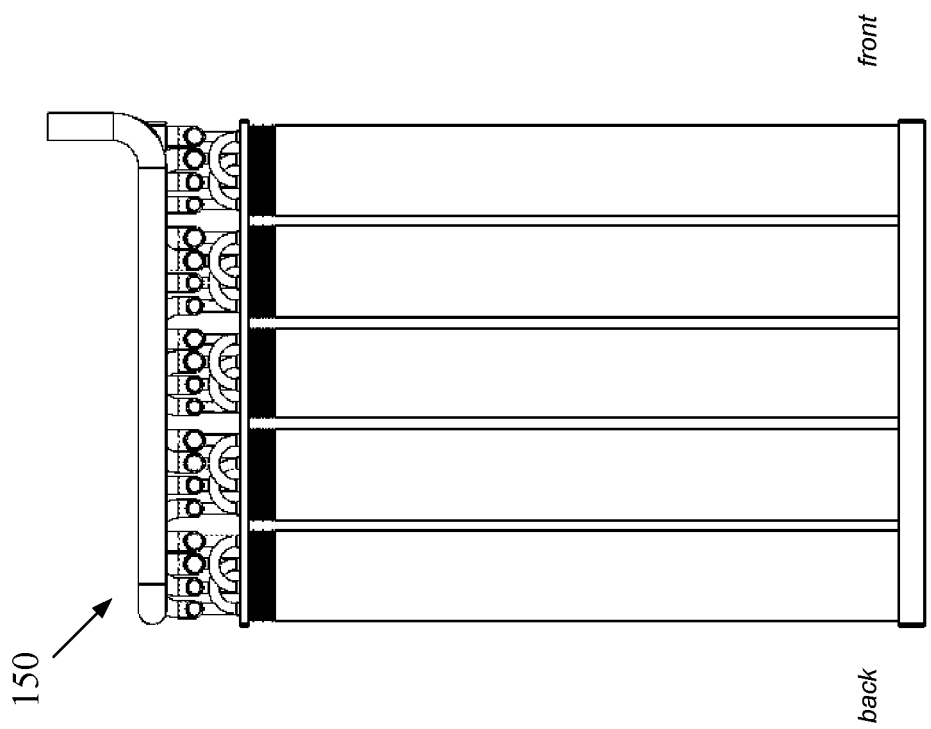
FIG. 14 is a left side elevational view of the heat exchanger assembly of the apparatus of FIG. 1.

Returning to the drawings, FIG. 7 is an exploded perspective view of an interior tank and an interior tank cover of the apparatus 100. FIGS. 8 through 17 are views of the heat exchanger assembly 150 of the apparatus 100. In this regard, FIG. 8 is a front elevational view of the heat exchanger assembly 150; FIG. 9 is a back or rear elevational view of the heat exchanger assembly 150; FIG. 10 is an isometric view of the heat exchanger assembly 150; FIG. 11 is a top plan view of the heat exchanger assembly 150; FIG. 12 is a bottom plan view of the heat exchanger assembly 150; FIG. 13 is a perspective view of the right side of the heat exchanger assembly 150; FIG. 14 is a left side elevational view of the heat exchanger assembly 150; FIG. 15 is a right side elevational view of the heat exchanger assembly of the apparatus of FIG. 1; FIG. 16 is a front elevational view of the heat exchanger assembly 150; and FIG. 17 is a rear or back elevational view of the heat exchanger assembly 150.

Figure 18:
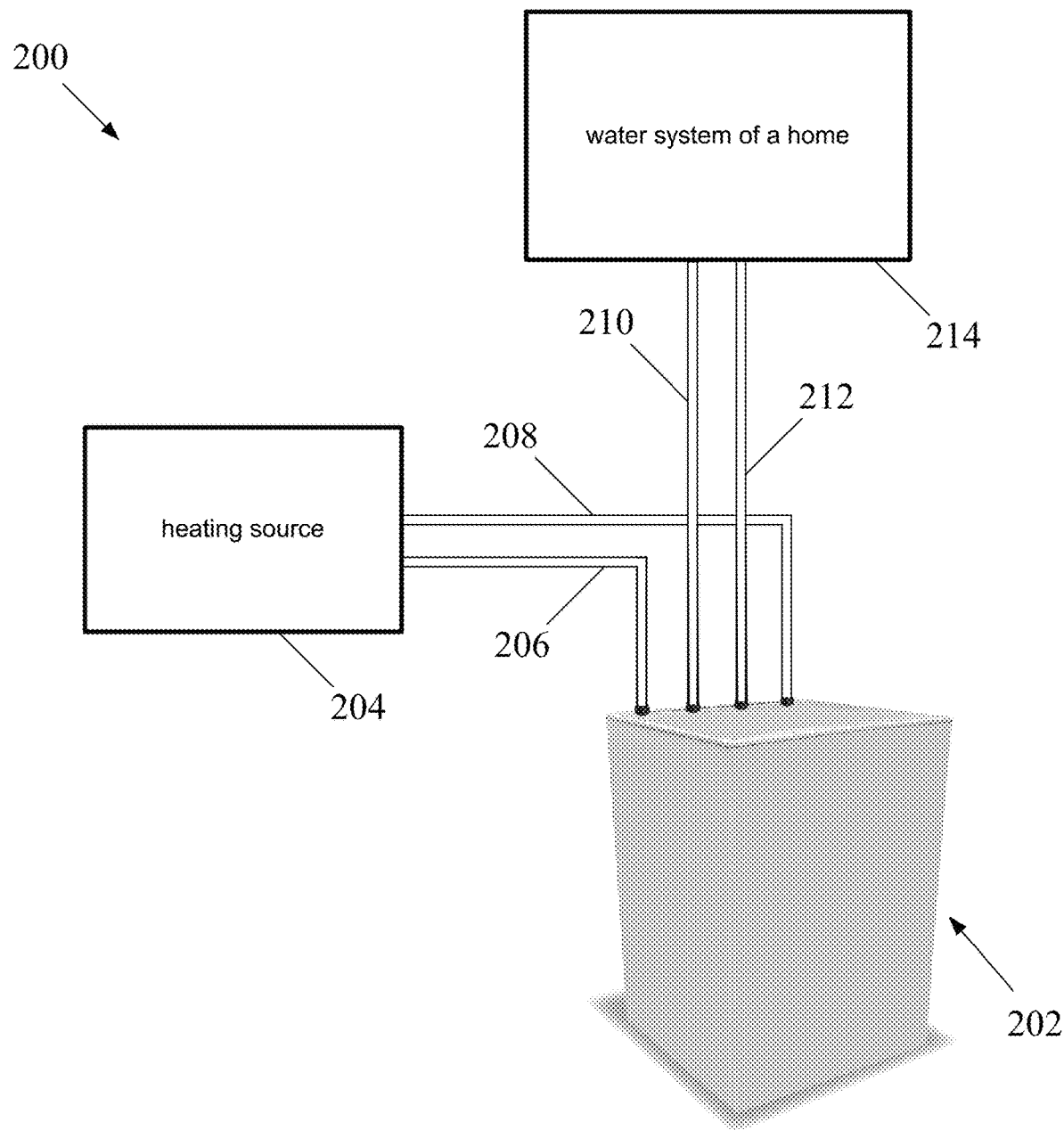
FIG. 18 is a schematic illustration of an implementation that utilizes a thermal retention apparatus in accordance with one or more aspects and features of the invention.

FIG. 18 is a schematic illustration of an implementation 200 utilizing a thermal retention apparatus 202 in accordance with one or more aspects and features of the invention. As illustrated, the PCM charging circuit is connected to external heating source 204 by lines 206, 208. The PCM discharging circuit is connected to a residential water system by lines 210, 212, whereby the thermal retention apparatus 202 serves as a hot water heater for home 214.

Figure 19:
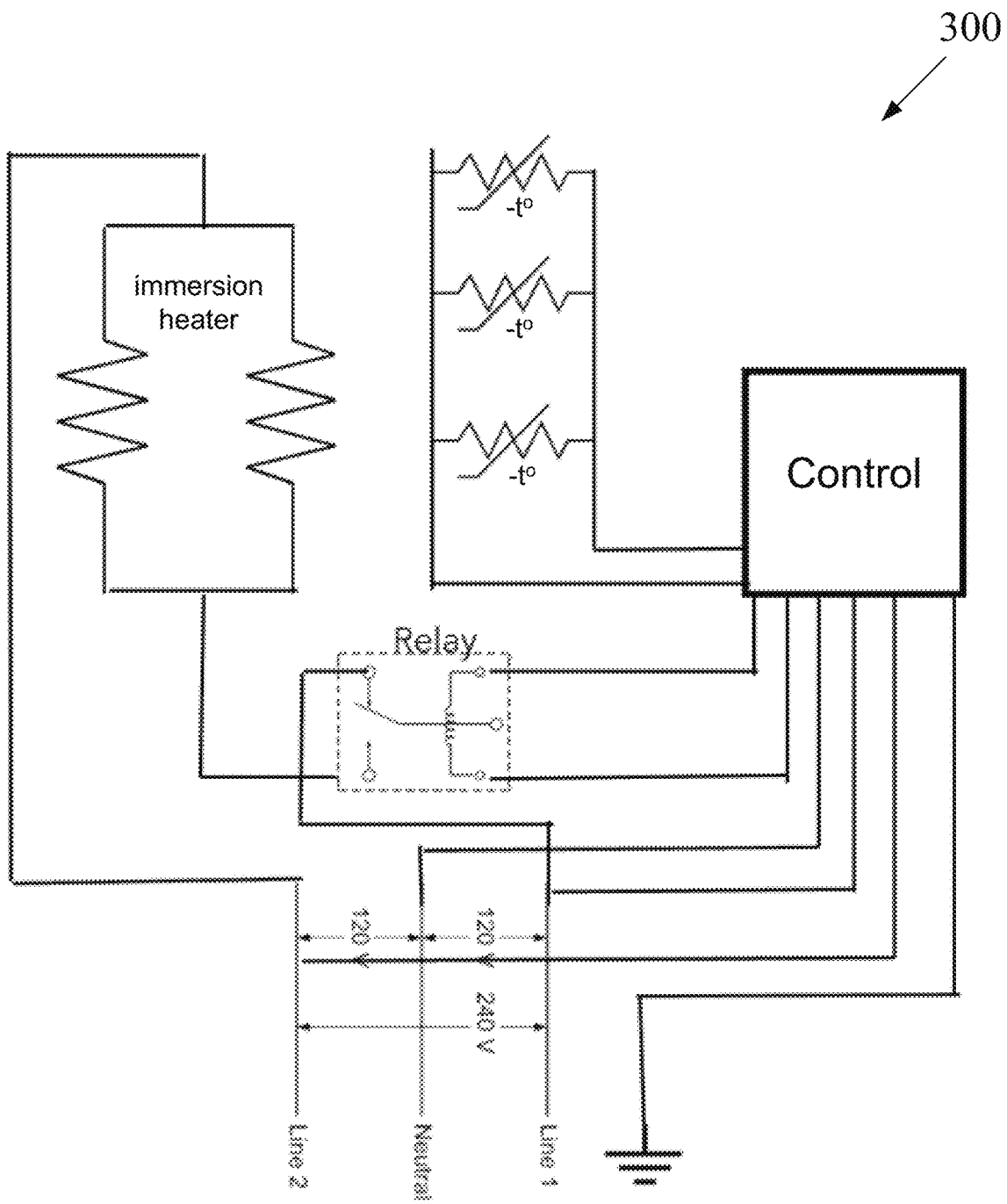
FIG. 19 is a schematic illustration of a control circuit for heating of the phase change material of a heat exchanger assembly of a thermal retention apparatus in accordance with one or more aspects and features of the invention.

FIG. 19 is a schematic illustration of a control circuit 300 for heating of phase change material of a heat exchanger assembly of a thermal retention apparatus in accordance with one or more aspects and features of the invention. As shown, immersion heaters are immersed in the phase change material and controlled by a control electrical component that closes a relay for initiating based on temperature readings from various areas of the phase change material. The control may be remote and wirelessly connected to temperature sensors of the thermal retention apparatus as well as wirelessly connected to the relay, or may be contained within the interior space 124. In any scenario, the heaters are connected to a power source for generating heat for heating of the phase change material. This is particularly beneficial if emergency heating is needed.

Figure 20:
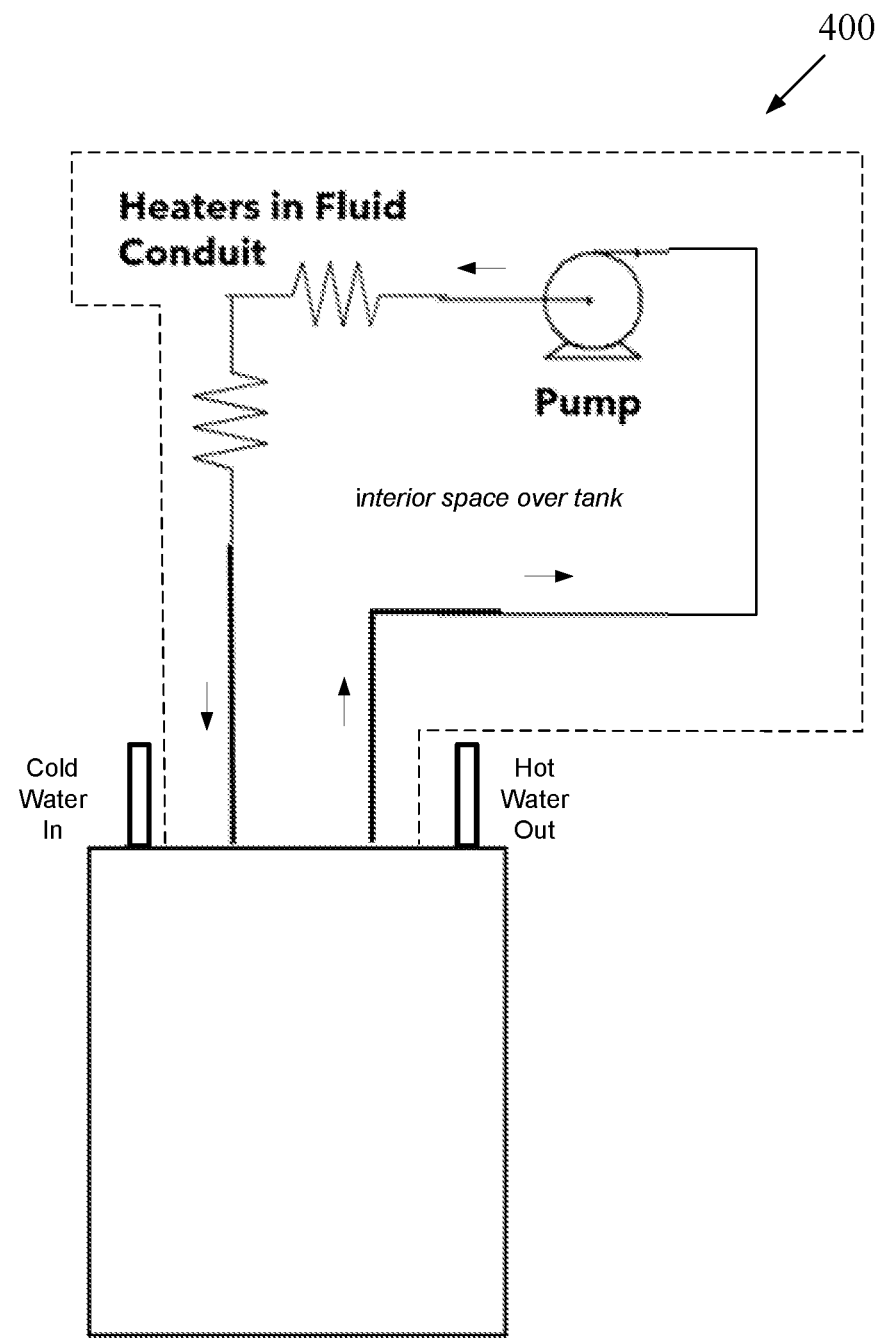
FIG. 20 is a schematic illustration of an alternative embodiment of a thermal retention apparatus in accordance with one or more aspects and features of the invention.
Figure 21:
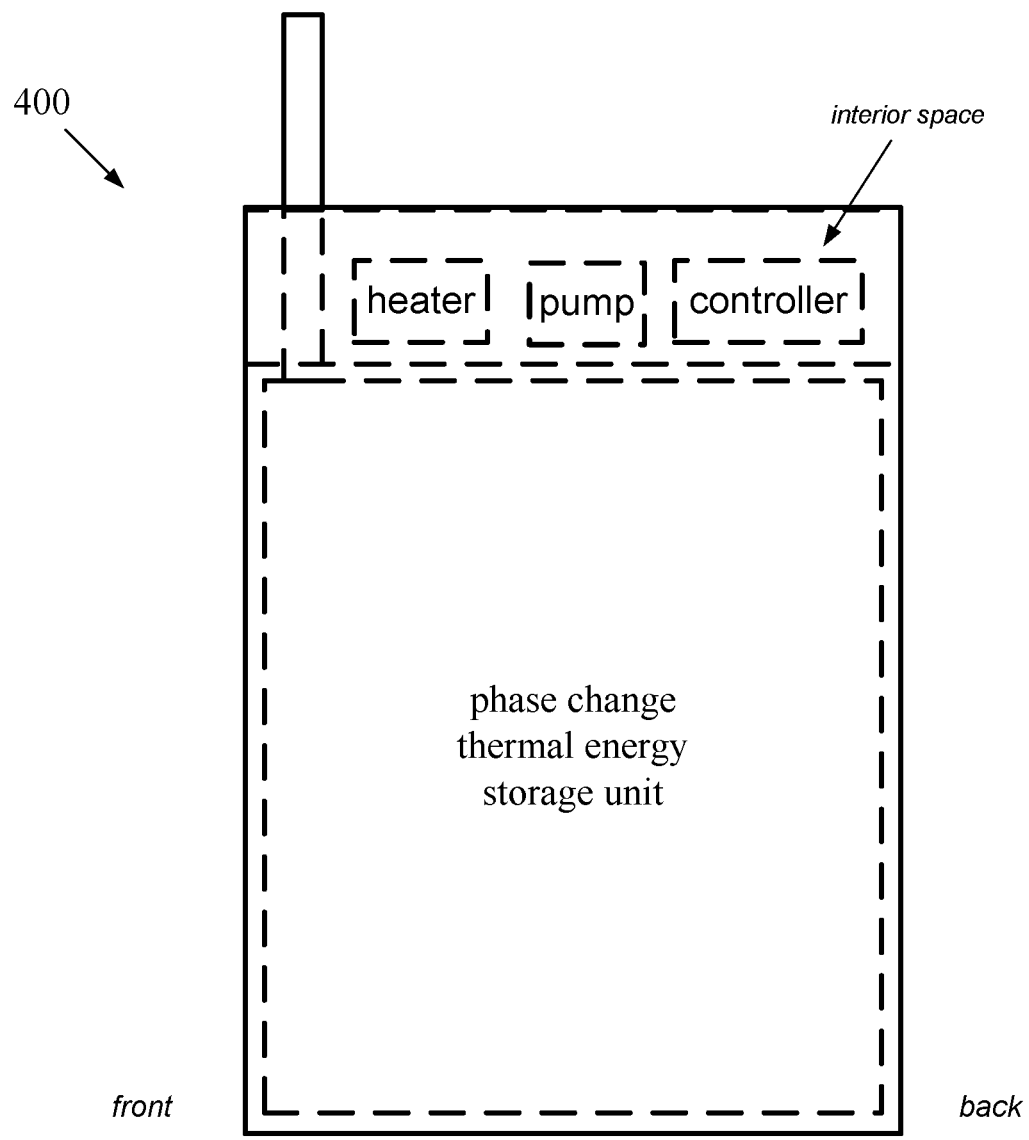
FIG. 21 is a schematic illustration of the alternative embodiment of the thermal retention apparatus of FIG. 20.

FIG. 20 is a schematic illustration of an alternative embodiment of a thermal retention apparatus 400 in accordance with one or more aspects and features of the invention. As shown, the PCM charging circuit is closed insofar as the fluid flow through the PCM charging circuit is completely contained within the apparatus 400 and there are no external conduits of the PCM charging circuit. In this alternative embodiment, the fluid that passes through the PCM charging circuit is heater by electric heaters that are located within the interior space between the lid and cover and, preferably, within the fluid passageways of the PCM charging circuit for direct contact with and heating of the fluid for charging the phase change material. One or more pumps also are located within the interior space for circulating the heated fluid through the PCM charging circuit. In this embodiment, only the inlet and outlet conduit of the PCM discharging circuit extend to the exterior of the apparatus for external fluid connection. FIG. 21 is another schematic illustration of the thermal retention apparatus 400 showing the location of the heater, pump, and controller within the interior space of the apparatus 400.

Figure 22:
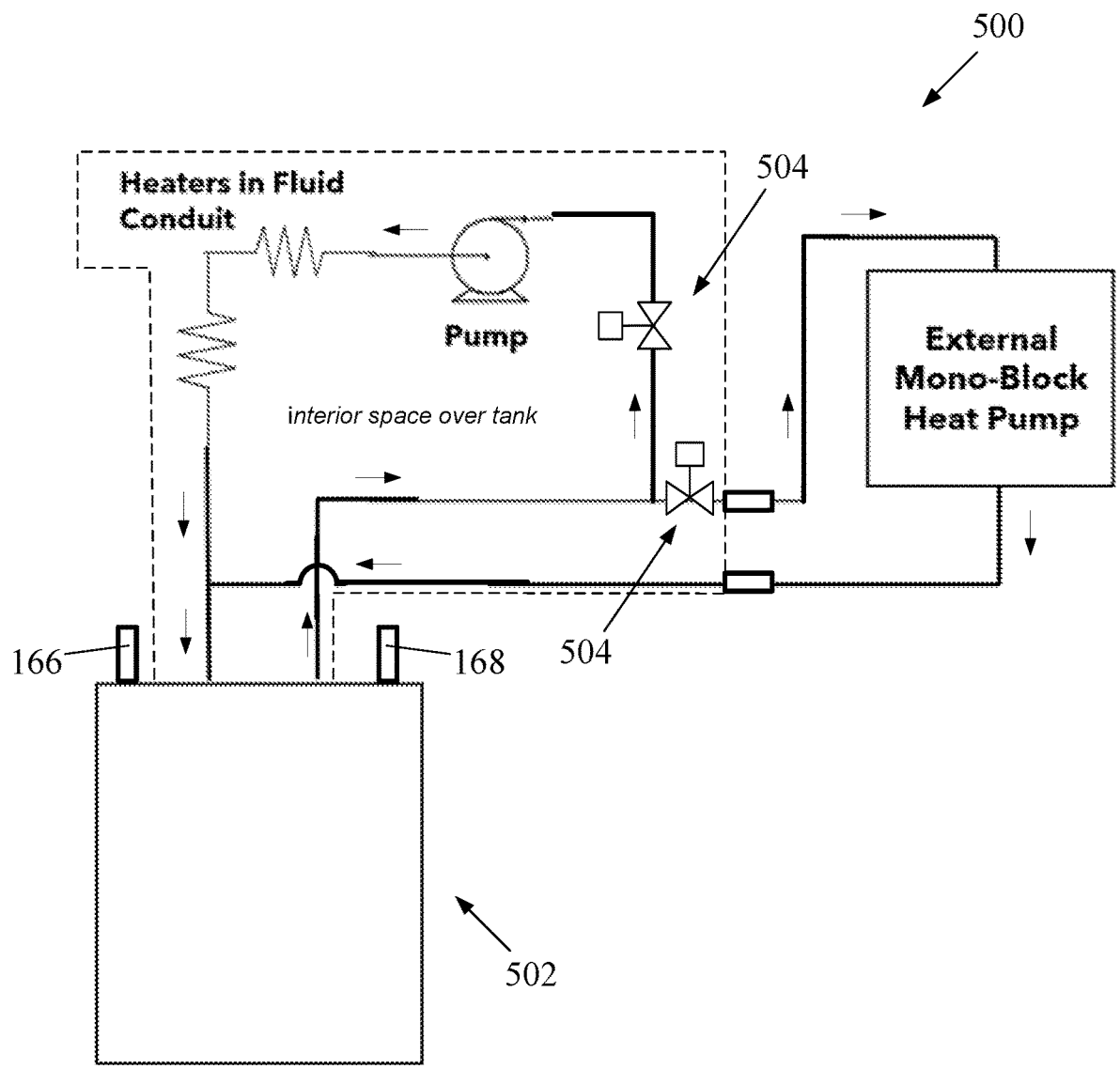
FIG. 22 is another illustration of an implementation that utilizes another thermal retention apparatus in accordance with one or more aspects and features of the invention.

FIG. 22 is another illustration of an implementation 500 utilizing yet another thermal retention apparatus 502 in accordance with one or more aspects and features of the invention. This implementation includes characteristics described above and represents a hybrid implementation. In particular, the apparatus 502 includes in part a closed PCM charging circuit similar to that of apparatus 400; however, the PCM charging circuit includes the inlet and outlet conduits 166, 168 of the PCM charging circuit and further includes valves 504 for altering the flow through the PCM charging circuit from that of a closed loop to one of an open loop that includes an external heating source, such as a mono-block heat pump.

It is believed that thermal energy retention apparatus in accordance with one or more aspects and features of the invention provide a cost-effective method for heating water that out performs conventional hot water heating apparatus. Indeed, it is believed that water can be heating quickly in a manner that performs just as well as—if not better than—"instantaneous" or "tankless" conventional water heaters.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Indeed, while thermal energy retention apparatus have been described in the context of being used to heat water, the utility of the thermal energy retention apparatus is not so limited. The thermal energy retention apparatus of the invention may be used in any implementation benefiting from or requiring the use of a heat pump reservoir or phase change thermal battery. Moreover, such thermal energy retention systems may be used for heating or cooling applications, as will be appreciated by the Ordinary Artisan.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A thermal retention apparatus comprising:
a tank; and
a phase change thermal energy storage unit contained within the tank and comprising a phase change material and a heat exchanger assembly;
wherein the heat exchanger assembly comprises a phase change material (PCM) charging circuit for charging the phase change material, and a PCM discharging circuit for discharging the phase change material;
wherein the heat exchanger assembly comprises a plurality of heat exchanger modules immersed within the phase change material;
wherein the PCM charging circuit comprises an arrangement of fluid flow through the heat exchanger modules that is in parallel; and
wherein the PCM charging circuit is configured to be switched between a closed loop, in which the fluid that flows through the PCM charging circuit does not flow external to the apparatus, and an open loop, in which the fluid that flows through the PCM charging circuit flows to an external heating source located on an exterior of the apparatus.

* * * * *